Feb. 17, 1948. J. K. PENNY 2,436,325
BROACH
Filed Nov. 27, 1943
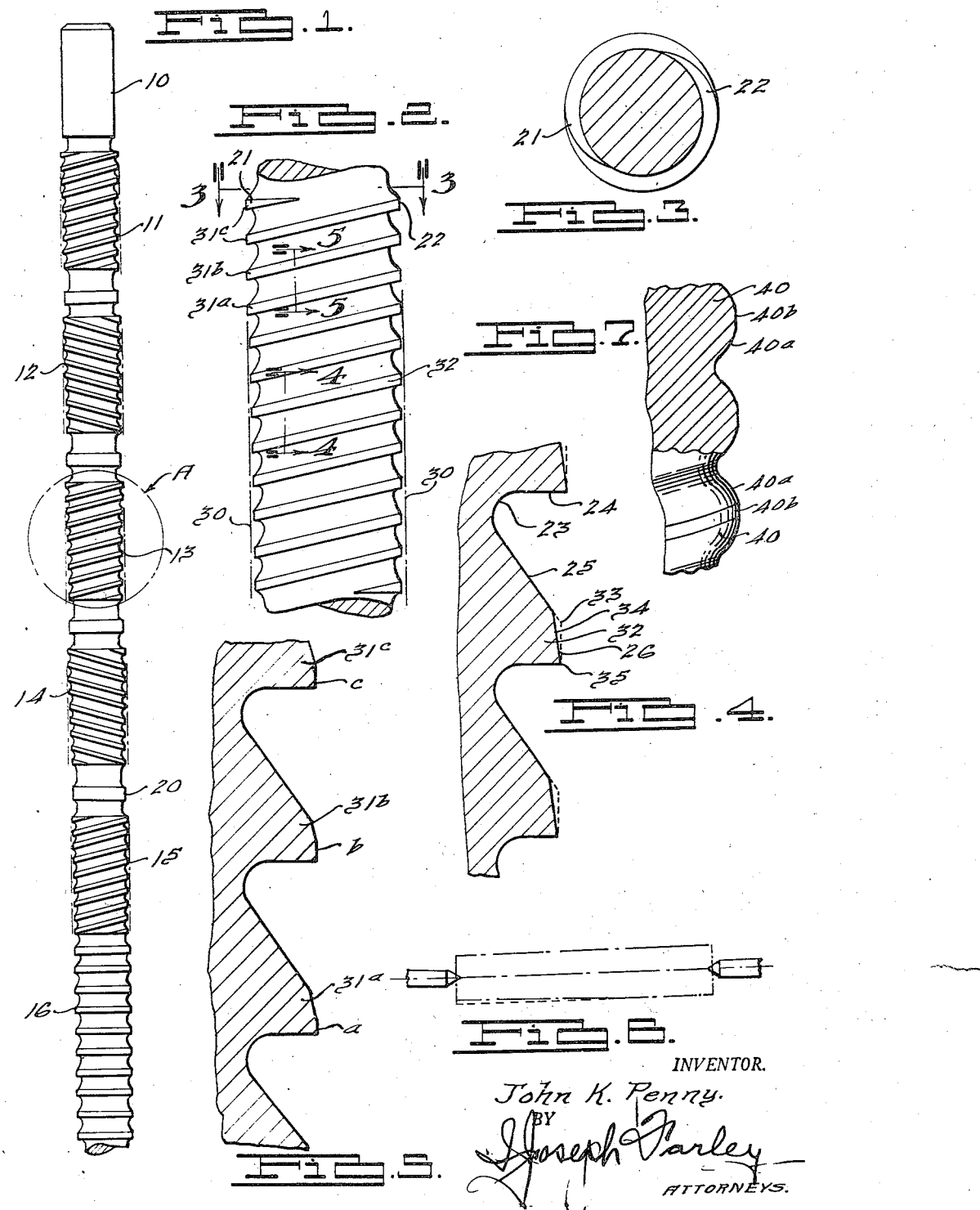
INVENTOR.
John K. Penny.
BY
Joseph Varley
ATTORNEYS.

Patented Feb. 17, 1948

2,436,325

UNITED STATES PATENT OFFICE 2,436,325

BROACH

John K. Penny, Grosse Pointe, Mich., assignor to Spirex Broach Corporation, Detroit, Mich., a corporation of Michigan Application November 27, 1943, Serial No. 511,946

10 Claims. (Cl. 29—95.1)

This invention relates to broaches such as are extensively used in mass production for finishing large quantities of similar workpieces.

The use of broaches for finishing workpieces and particularly workpieces provided with a hole of circular or other cross-sectional contour has increased proportionately with the spread of mass production methods. Although broaches have been very widely used for many years, difficulty is frequently experienced in their use because of the tendency of a broach provided with cutting teeth in the finishing section thereof which extend at right angles to the longitudinal axis of the broach to leave tooth or chatter marks in the workpiece. An even more serious objection in this type of broach is the production of longitudinally extending scratch lines resulting from nicks in the cutting edges of the teeth which in continued use tend to be reproduced in the following teeth. Another difficulty or objectionable feature of broaches generally is their tendency to cut the hole to be finished slightly larger in diameter at the end of the hole where the broach is entered, thus resulting in what is known as a bellmouth hole. In order to avoid the objectionable tooth or chatter marks of what may be termed a straight tooth broach, many broaches have been made with spiral teeth in the finishing section. The use of the spiral broach as heretofore constructed, however, is subject to the objection that the broach either tends to screw into the work or tends to exert a great pressure on the work which tends not only to rotate or turn the work but also to distort or expand the workpiece and thus produce an inaccurate sized hole.

The present invention has for its principal object to provide a new and improved construction for a broach whereby the objectionable features above noted will be obviated, and a construction such that in addition to eliminating tooth and chatter marks, an extremely high finish will be imparted to the surface of the hole and also the work will be held precisely to the required finished dimension.

The above and other objects of the present invention will appear more fully from the following more detailed description and by reference to the accompanying drawings forming a part hereof, wherein:

Fig. 1 is a side elevation of a broach constructed in accordance with the principles of the present invention;

Fig. 2 is a greatly enlarged view of that section of the broach shown in Fig. 1 enclosed within the dot-and-dash lines circle A;

Fig. 3 is a transverse section on the line 3—3 of Fig. 2;

Fig. 4 is a still further enlarged section taken on the line 4—4 of Fig. 2 and showing the teeth in the tapered part of the spirally fluted section in their finished condition;

Fig. 5 is a view similar to Fig. 4 but taken on the line 5—5 of Fig. 2 showing the broach teeth at the finishing end of the spirally fluted broach section, and Fig. 6 is a somewhat diagrammatic view showing the manner in which the broach teeth are given their final shape.

Fig. 7 is a view similar to Figs. 4 and 5 showing a modified construction in which the broach is provided with burnishing teeth at the end of the finishing section.

As shown in Fig. 1 of the drawings, the broach 10 consists of a number of sections as indicated by the reference characters 11, 12, 13, 14, 15 and 16. Section 16 of the broach is provided with teeth which, as clearly shown, extend at a right angle to the axis of the broach, while sections 11 to 15, which are semi-finishing and finishing sections, are provided with spirally arranged flutes or teeth, the flutes of each section being of different hand than the flutes of the adjacent section, all as clearly shown in Fig. 1. As the spiral cutting teeth tend to produce a continuous spiral chip or shaving which curls through the flute and out the back end thereof, I have located at the end of each spirally fluted section a chip breaking or hole clearing tooth 20. Each of these clearing teeth is of slightly smaller diameter than that of the finish size of spiral section which it follows. Each of the sections 11 to 15 are of similar construction; there being an increase in diameter of a few thousandths of an inch from one section to another. As the construction of each spiral section of the broach is similar, a description of one section will suffice for all. The broach section 13 which is shown in the enlarged view, Fig. 2, is typical of each of the other sections and it consists of a plurality of spirally fluted teeth which in the particular constructional example illustrated are composed of two separate spirals or, as they are usually designated in the art, "starts" 21, 22.

In constructing the broach of the present invention, after the stock has been rough turned to the desired O. D., the flutes or teeth are formed by following the same procedure as that employed for chasing a buttress-shaped thread having a root diameter tangent to the straight flank of the thread, the root diameter being curved as indicated at 23 and being tangent to the straight flank 24 which forms the front cutting face of the broach teeth. The other flank 25 of the thread extends at an angle such as to establish a desired land width as indicated at 26 in Fig. 4 of the drawings.

After the flutes or teeth are rough formed in any suitable way as by a thread chasing operation in a lathe as just described and the tool is hardened, the outside diameter of the teeth are first ground straight for the entire length of any particular spirally fluted section, such grinding operation being similar to that employed for grinding a cylindrical plug gauge. After the teeth have been ground cylindrically for their entire length, the lathe center may then be offset as indicated in Fig. 6 of the drawings to the proper amount for securing the desired taper of the spirally fluted teeth which will also establish the starting diameter of each section and will, in addition, establish the length of the straight portion at the finishing end of each section. The straight flank portion of each of the spiral flutes may then be sharpened with a properly formed or contoured grinding wheel in a lathe in the same manner as the threaded or fluted portion was originally cut or chased.

After the sharpening of the straight flank or the cutting face of the broach teeth, the tops of the teeth are then backed off sharp to a cutting edge by a wheel dressed to the proper angle, this work also being accomplished by having the tailstock of the lathe offset at the same taper as was used for forming the tapered part of the broach section. As a result of this procedure the broach teeth in the entire tapered portion of each section will be backed off to a sharp cutting edge and, because of the fact that the straight section of the broach at the finishing end is set off-center, as the grinding wheel runs through onto the straight section of the broach a straight land of gradually increasing width will be left upon the teeth of the straight section, the amount of increase in the width of the land obviously depending entirely upon the angle of taper in the tapered portion of the broach.

In the enlarged view of Fig. 2 the parallel lines indicated by the reference character 30, shown at each side of the broach, are parallel with the longitudinal axis of the broach and serve to indicate the diameter of the straight cylindrical teeth, three of which, as indicated by the reference characters 31a, 31b and 31c, are left at the finishing end of the broach section. The remainder of the broach teeth which are indicated by the reference character 32 are tapered, as clearly indicated in Fig. 2 of the drawing.

In Fig. 4 of the drawing is shown a number of the teeth 32 in greatly enlarged cross-section, the dotted line portion indicated by the reference character 33 indicating that portion of the top of the broach teeth that has been ground away so as to produce a tooth having a sharp back-off 34 that terminates in the sharp cutting edge 35.

In Fig. 5 of the drawing the teeth 31a, 31b and 31c are shown in greatly enlarged cross-section and the reference characters a, b and c indicate the varying width of land that is formed on each of the finishing teeth as the grinding wheel used for backing off the teeth runs out over the straight cylindrical portion of the broach due to the offsetting of the tailstock of the lathe in performing this backing-off operation. As will be clearly apparent from the drawing, the land a is of less width than the land b and the latter is less in width than the land c. The distinctive feature of the land on the straight cylindrical portion of the teeth is that it starts from zero width and gradually reaches a maximum at the extreme end. As a result each time the broach is sharpened the straight cylindrical finish sized section always consists of a portion in which the finish diameter teeth begins with a sharp edged tooth and with a land of gradually increasing width immediately following the sharp edge tooth insuring the cutting of the hole accurately to the required dimension and the following land tending to produce an exceptionally smooth and high burnished finish. And further a much longer period of service of the broach is secured than if the broach teeth were backed off sharp for the full length thereof.

I have found that for best results the helix angle of the spirally fluted portions of the broach should preferably be between 5° to 35°, an angle in the order of 12° to 15° being preferred. When the helix angle of the spirals are kept within the limits above set forth, there is no tendency for the broach to revolve as it is being pushed or pulled through the workpiece. Neither is there any tendency for the broach to cause rotation of the workpiece or distortion thereof. A constant and uniform pressure is applied to the workpiece and because of the helix angle of the teeth, the production of tooth or chatter marks in the hole is obviated. Furthermore, there is no tendency to produce bellmouth at the end of the hole where the broach is entered and an extremely high finish is obtained on the broached surface. Likewise, the finished diameter of the hole broached can be kept within the more precise and accurate limits. The use of the spiral teeth extending at a helix angle as described results in the teeth performing a skewed slicing cut as distinguished from a straight chop-like cut.

The use of spirals of opposite hand in each adjacent spirally fluted section also serves to contribute materially towards the elimination of tooth and chatter marks and to assure the production of a very high finish upon the broached surface.

In Fig. 7 of the drawing, I have shown a broach in which there is provided at the finishing end thereof one or more burnishing teeth 40. These teeth as shown have the sides of the tops thereof of curved configuration as indicated at 40a, which merge with the flats or lands 40b. In other words, the teeth are rounded and are not provided with a sharp cutting edge. The rounding of the teeth will obviously cause them to perform a burnishing function or action such as would be performed by the use of the hand burnishing tool. This results in compressing the particles of the surface skin of the workpiece and produces a high glossy and polished finish on such surface. These burnishing teeth perform a continuation of the spirally fluted teeth and are cut originally in the same manner and at the same time as the spiral cutting teeth, but in the finishing of the broach these burnishing teeth instead of being ground to a sharp cutting edge are ground by a formed grinding wheel or in any other suitable way to form the rounded surfaces shown in the drawing on the tops of the teeth.

While I have shown the broach illustrated in the drawing as being provided with two separate spirals or "starts" it will, of course, be understood that the number of starts may be varied as desired. Ordinarily the number of starts employed will be increased with an increase in the diameter of the broach. For small diameter broaches, two starts will ordinarily be employed, whereas for larger broaches, say three or four inches in diameter, the number of starts may for example be increased to as many as eighteen starts.

Although I have shown in Fig. 1 a broach having five spirally fluted toothed sections and one straight toothed roughing section, it will, of course, be understood that any desired number of spiral sections may be employed either with or without a straight toothed roughing section and that the broach obviously may be constructed of any desired diameter, length or cross-sectional configuration depending upon the nature of the work to be produced.

While I have shown a constructional example of a broach that has proven highly successful in actual commercial usage, it will, of course, be understood that many changes, variations and modifications of the particular constructional example selected for the purpose of illustration may be resorted to without departing from the spirit of the invention as set forth in the claims hereunto appended.

I claim:

1. A broach having a rough cutting section having teeth extending at right angles to the longitudinal axis of said broach and a plurality of finishing sections each having spirally fluted teeth extending at an angle to said axis, the teeth of one spirally fluted section being of opposite hand to the spirally fluted teeth of an adjacent section, and a chip-breaking and hole clearing tooth between each adjacent broach section.

2. A broach having a rough cutting section having teeth extending at right angles to the longitudinal axis of said broach and a plurality of finishing sections each having spirally fluted teeth extending at an angle to said axis, the teeth of each adjacent spirally fluted section being of opposite hand to the spirally fluted teeth of the adjacent section, and the teeth of said spirally fluted section extending at a helix angle of from 5° to 35° to planes at right angles to the longitudinal axis of said broach.

3. A broach having a rough cutting section having teeth extending at right angles to the longitudinal axis of said broach and a plurality of finishing sections each having spirally fluted teeth extending at an angle to said axis, in which the spirally fluted section of said broach is tapered for the major portion thereof and the teeth in the remaining portion are of straight cylindrical shape.

4. A broach having a rough cutting section having teeth extending at right angles to the longitudinal axis of said broach and a plurality of finishing sections each having spirally fluted teeth extending at an angle to said axis, in which the teeth of the major portion of said spirally fluted sections are tapered and are backed off to a sharp cutting edge.

5. A broach having a rough cutting section having teeth extending at right angles to the longitudinal axis of said broach and a plurality of finishing sections each having a spirally fluted tooth section extending at an angle to said axis, the teeth of the major portion of said section being tapered and backed off to a sharp cutting edge, and the remaining portion of the teeth in said section being of straight cylindrical contour and provided with a straight land which increases gradually in width from zero to a maximum at the extreme finishing end of said straight cylindrical portion.

6. A broach having a rough cutting section having teeth extending at right angles to the longitudinal axis of said broach and a plurality of finishing sections each having spirally fluted teeth extending at an angle to said axis, the teeth of one spirally fluted section being of opposite hand to the spirally fluted teeth of the adjacent section, in which the spirally fluted section of said broach is tapered for the major portion thereof and the teeth in the remaining portion are of straight cylindrical shape.

7. A broach having a rough cutting section having teeth extending at right angles to the longitudinal axis of said broach and a plurality of finishing sections each having spirally fluted teeth extending at an angle to said axis, the teeth of one spirally fluted section being of opposite hand to the spirally fluted teeth of the adjacent section, in which the teeth of the major portion of said spirally fluted section are tapered and are backed off to a sharp cutting edge.

8. A broach having a rough cutting section having teeth extending at right angles to the longitudinal axis of said broach and a plurality of finishing sections each having spirally fluted teeth extending at an angle to said axis, in which the teeth of the major portion of said spirally fluted section are tapered and are backed off to a sharp cutting edge and the remaining portion of the teeth in the spirally fluted section are of straight cylindrical contour and are provided with straight lands of gradually decreasing width.

9. A broach having a spirally fluted tooth section extending at an angle to said axis, the teeth of the major portion of said section being tapered and backed off to a sharp cutting edge, and the remaining portion of the teeth in said section being of straight cylindrical contour and provided with a straight land which increases gradually in width from zero to a maximum at the extreme finishing end of said straight cylindrical portion.

10. A broach having a spirally fluted cutting tooth section extending at an angle to said axis, the teeth of the major portion of said section being tapered and backed off to a sharp cutting edge, and the remaining portion of the teeth in said section being of straight cylindrical contour and provided with a straight land which increases gradually in width from zero to a maximum at the extreme finishing end of said straight cylindrical portion, and a hole-clearing tooth slightly smaller in diameter than the finishing end of said spirally fluted cutting tooth section and rearwardly spaced from said end.

JOHN K. PENNY.

REFERENCES CITED

The following references are of record in the file of this patent:

UNITED STATES PATENTS

| Number | Name | Date |
| --- | --- | --- |
| 1,724,669 | La Pointe | Aug. 13, 1929 |
| 1,724,511 | Perkins | Aug. 13, 1929 |
| 2,255,140 | Waring | Sept. 9, 1941 |
| 2,292,900 | Schmidt | Aug. 11, 1942 |
| 1,935,774 | Halborg | Nov. 21, 1933 |

FOREIGN PATENTS

| Number | Country | Date |
| --- | --- | --- |
| 343,496 | Great Britain | Aug. 13, 1929 |
| 4,068 | Great Britain | Feb. 19, 1912 |
| 547,347 | France | Dec. 7, 1922 |